(12) United States Patent
Abdulhayoglu

(10) Patent No.: US 7,757,088 B2
(45) Date of Patent: Jul. 13, 2010

(54) METHODS OF ACCESSING AND USING WEB-PAGES

(76) Inventor: Melih Abdulhayoglu, 10 Hey Street, Bradford, West Yorkshire (GB) BD7 1DQ ( * ) Notice: Subject to any disclaimer, the term of this patent is extended or adjusted under 35 U.S.C. 154(b) by 1498 days.

(21) Appl. No.: 10/239,114

(22) PCT Filed: Mar. 20, 2001

(86) PCT No.: PCT/GB01/01226

§ 371 (c)(1),
(2), (4) Date: Dec. 2, 2002

(87) PCT Pub. No.: WO01/71554

PCT Pub. Date: Sep. 27, 2001

(65) Prior Publication Data

US 2004/0030784 A1    Feb. 12, 2004

(30) Foreign Application Priority Data

Mar. 20, 2000    (GB)    .................................... 0006606.8

(51) Int. Cl.
*H04L 9/00* (2006.01)
(52) U.S. Cl. .................. 713/175; 713/155; 713/156; 713/167; 713/176; 726/1; 726/2; 705/44; 705/62; 715/200; 715/273; 715/438; 715/730; 709/227
(58) Field of Classification Search ................ 713/169, 713/171, 175, 176, 155, 156; 726/2, 22, 726/3, 4; 715/738; 345/741; 705/44
See application file for complete search history.

(56) References Cited

U.S. PATENT DOCUMENTS

| 5,855,020 | A | * | 12/1998 | Kirsch ........................ 707/10 |
| 5,958,051 | A | * | 9/1999 | Renaud et al. ............... 726/22 |
| 6,018,724 | A | * | 1/2000 | Arent ......................... 705/44 |
| 6,018,801 | A | * | 1/2000 | Palage et al. ................. 726/2 |
| 6,131,162 | A | * | 10/2000 | Yoshiura et al. ............. 713/176 |
| 6,393,420 | B1 | * | 5/2002 | Peters ......................... 707/9 |
| 6,499,109 | B1 | * | 12/2002 | Balasubramaniam et al. . 726/22 |
| 6,542,813 | B1 | * | 4/2003 | Kovacs ....................... 701/208 |

(Continued)

FOREIGN PATENT DOCUMENTS

EP    0 982 927 A1    3/2000

(Continued)

OTHER PUBLICATIONS

Honjo et al, Internet—marks: the secure seal for WWW site authentication, IEEE 2000.*

(Continued)

*Primary Examiner*—Nasser Moazzami
*Assistant Examiner*—Shanto M Abedin
(74) *Attorney, Agent, or Firm*—Richard Jeremy Rowley

(57) ABSTRACT

A method and system for conveying trust and security to consumers regarding the validity of a web page or the web-pages source by showing a feature from webpage as determined by a digital certificate associated with the webpage. The security of the method and system can be further enhanced by preventing any overwriting of the feature and by displaying the feature independent of the web-page being accessed by the user.

42 Claims, 8 Drawing Sheets

U.S. PATENT DOCUMENTS

| | | | | |
|---|---|---|---|---|
| 6,658,394 | B1* | 12/2003 | Khaishgi et al. | 705/58 |
| 6,950,932 | B1* | 9/2005 | Lavian et al. | 713/151 |
| 7,024,691 | B1* | 4/2006 | Herzberg et al. | 726/5 |
| 7,107,548 | B2* | 9/2006 | Shafron | 715/826 |
| 7,203,838 | B1* | 4/2007 | Glazer et al. | 713/176 |
| 2001/0033297 | A1* | 10/2001 | Shastri et al. | 345/741 |
| 2002/0124172 | A1* | 9/2002 | Manahan | 713/176 |
| 2007/0192725 | A1* | 8/2007 | Chen et al. | 715/779 |

FOREIGN PATENT DOCUMENTS

WO        WO 99/43167        8/1999

OTHER PUBLICATIONS

Zishuang Ye et al, Web spoofing revisited: SSL and beyond, Feb. 2002.*

Yuan et al, Web spoofing 2001, Jul. 2001.*

Privacy Mark Award System, Yamadori et al, Mar. 2001 JIPDEC, pp. 1-14.*

Web Spoofing: An Internet Con Game, Felten et al, Department of Computer Science, Princeton University, 1997, pp. 1-9.*

Global Certificate usage with the OS/390 Webservers, IBM, Feb. 26, 1999, pp. 1-35.*

M.G. Fennema et al, Auditing the Internet: An Introduction to Web Assurance Services, pp. 71-82, 1998 John Wiley & Sons, Inc.*

Honjo et al, Internet-Marks: The Secure Seal for WWW Site Authentication, 2000 IEEE.*

James J. Cimino et al, Architecture for a Web-Based Clinical Information System that Keeps the Design Open and the Access Closed, pp. 121-125, AMIA Inc. 1998.*

Godwin J. Udo et al, Effective Commercial Web Site Design: An Empirical Study, pp. 313-318, IEEE 2000.*

* cited by examiner

METHODS OF ACCESSING AND USING WEB-PAGES

This application is a national stage application, according to Chapter II of the Patent Cooperation Treaty. This application claims the priority filing date of Mar. 20, 2000 for United Kingdom Patent Application No. 0006606.8.

FIELD OF THE INVENTION

The present invention relates to methods of displaying features relevant to web-pages, methods of accessing web-pages, methods of controlling access to web-pages, to executable programs and to computer systems for the aforesaid.

BACKGROUND TO THE INVENTION

In FIG. 1 of the drawings that follow there is shown an address bar 2 of part of an Internet Explorer (trade mark) web-page. The address bar 2 includes the unique resource locator (URL) 4 of the web-page in focus.

Unfortunately, the address bar may be exploited by fraudsters using a number of methods. These methods enable fraudsters to spoof legitimate web-pages.

For instance, in the URL 4 of the FIG. 1 address bar 2 it appears that it is for a CNN news article link. However, on closer inspection the actual address is http://18.69.0.44/evarady/www/_topstory_htm because the browser ignores everything before the "@" symbol (this part of the URL is designed to contain a user name and a password, though it is rarely used). After ignoring the first part, the next piece of data read by the browser is the internet protocol (IP) address and without manually checking this IP address, the user has no way of knowing to whom it belongs.

Thus, a fraudster could send a target an e-mail containing a link to what appears to be the target's bank asking them to log on to their account using user names, passwords, personal identification numbers etc which would, then, be supplied to the fraudster.

Another attack uses a JavaScript command within the source of the web-page which removes (switches off) the existing address bar and replaces it with a fake version. The fake address bar may, for instance, be drawn using bitmap images. It is then up to the fraudster what URL they choose to display within the address bar. Additionally, the padlock used to indicate a secure sockets layer (SSL) connection between a user and a server can also be faked using the same method. The only method of checking the authenticity of the padlock is for the user manually to try and view the service certificate, which hardly ever happens.

Using these and other methods fraudsters can establish imitation corporate and e-commerce web-pages for the gathering of on-line banking details, credit card numbers, passwords etc and then for example may distribute the URLs for such pages through e-mails.

SUMMARY OF THE INVENTION

According to the present invention in a first aspect, there is provided a method of displaying a feature relating to a web-page, the method comprising the steps of determining a feature of the web-page from a digital certificate associated with the web-page and displaying the feature.

Suitably, the certificate is associated with the web-page. Thus each web-page can have a unique certificate. Alternatively, a certificate may be unique for a root URL (such as www.amazon.com) and also be associated with pages derived therefrom (such as www.amazon.com/home).

Suitably, the feature is displayed independently of the web-page being accessed by the user.

Suitably, the feature is displayed in an independent window generated by an executable program separate from an internet browser program used for accessing the web-page.

Suitably, the method comprises the step of determining whether the address bar is switched off. Suitably, the feature is displayed only if the address bar is switched off.

Suitably, the method comprises the step of providing an indication that the address bar is switched off. Suitably, the indication is a visual indication. Suitably, the indication is an audible indication.

Suitably, the feature is one or more of a logo associated with the web-page, a company name associated with the web-page, the URL of the web-page and/or a service logo relevant to a service of the web-page. Suitably, the URL in the certificate is verified with the URL of the web-page prior to display thereof. The service logo may be an indication of an authorised payment method.

Suitably, the digital certificate is part of the web-page. Alternatively, the digital certificate is stored in a local cache. As another alternative, the certificate may be stored in a remote cache.

Suitably, the feature is displayed as part of a tool-bar.

Suitably, the feature is displayed whereby it cannot effectively be overwritten. Suitably, the displayed feature is displayed whereby it overwrites each time it is overwritten. Suitably, the displayed feature is set to be always on top of a browser in focus.

Suitably, the feature is displayed within the viewable area of the browser in focus.

Suitably, the certificate additionally comprises a computer executable file.

Suitably, the steps of determining a feature of the web-page and displaying the feature are carried out automatically. Generally, this has a plug-in software application. Thus user intervention is not required.

According to the present invention in a second aspect, there is provided a system for displaying a feature of a web-page, the system comprising means for determining a feature of the web-page from a digital certificate associated with the web-page and means for displaying the feature independently of the web-page being accessed by the user.

Suitably, the system comprises means for displaying the feature in an independent pane generated by an executable program separate from an internet browser program used for accessing the web-page.

Suitably, the system comprises means for determining whether the address bar is switched off. Suitably, the system comprises means for displaying the URL only if the address bar is switched off.

Suitably, the system comprises means providing an indication that the address bar is switched off. Suitably, the indication is a visual indication. Suitably, the indication is an audible indication.

Suitably, the feature is one or more of a logo associated with the web-page, a company name associated with the web-page, the URL of the web-page and/or a service logo relevant to a service of the web-page. Suitably, the URL in the certificate is verified with the URL of the web-page prior to display thereof. The service logo may be an indication of an authorised payment method.

Suitably, the feature is determined from a digital certificate. Suitably, the digital certificate is part of the web-page.

Alternatively, the digital certificate is stored in a local cache. As another alternative, the certificate may be stored in a remote cache.

Suitably, the certificate is associated with the web-page. Thus each web-page can have a unique certificate. Alternatively, a certificate may be unique for a root URL (such as www.amazon.com) and also be associated with pages derived therefrom (such as www.amazon.com/home).

Suitably, the feature is displayed as part of a tool-bar.

Suitably, the feature is displayed whereby it cannot effectively be overwritten. Suitably, the displayed feature is displayed whereby it overwrites each time it is overwritten. Suitably, the displayed feature is set to be always on top.

Suitably, the feature is displayed within the viewable area of the browser in focus.

Suitably, the steps of determining a feature of the web-page and displaying the feature are carried out automatically. Generally, this has a plug-in software application. Thus user intervention is not required.

According to the present invention in a third aspect, there is provided a method of accessing a web-page having an IP address and a web-page locator, the method comprising the steps of upon entry of an IP address or a web-page locator providing digitally signed combination of the IP address and the web-page locator and accessing the web-page only if the digital signature is verified.

Suitably, the web-page locator is a company name. Suitably, the web-page locator is a URL.

Suitably, the digitally signed combination is a digital certificate.

According to the present invention in a fourth aspect, there is provided a method of accessing a web-page, the method comprising the steps of:
a) on a digital computer entering a locator web-page locator other than an URL or an IP address into a search facility
b) determining an IP address from the locator; and
c) accessing a web-page according to the IP address.

Suitably, the IP address is determined from a digitally signed combination of the IP address and the web-page locator. Suitably, access to the web-page is permitted only if the digital signature is verified.

Suitably, the web-page locator is a company name.

According to the present invention in a fifth aspect, there is provided a method of controlling access to a web-page, the method comprising the steps of:
a) setting an access permission on a browser;
b) determining an access permission level of a web-page from a digital certificate associated with the web-page; and
c) permitting access to the web-page only if the digital certificate verified access permission level of the web-page is within the access permission.

Suitably, the certificate is embedded in the web-page. Alternatively, the certificate is in a local cache. Alternatively, the certificate is in a remote cache.

According to the present invention in a sixth aspect, there is provided a method of displaying a feature relating to a web-page, the method comprising determining a feature of the web-page and displaying the feature on top of a browser in focus whereby the displayed feature substantially cannot be overwritten by the web-page.

Suitably, the feature is displayed within the viewable area of the browser in focus.

Suitably, the feature is displayed independently of the web-page being accessed by the user.

Suitably, the feature is displayed in an independent window generated by an executable program separate from an internet browser program used for accessing the web-page.

Suitably, the method comprises the step of determining whether the address bar is switched off. Suitably, the feature is displayed only if the address bar is switched off.

Suitably, the method comprises the step of providing an indication that the address bar is switched off. Suitably, the indication is a visual indication. Suitably, the indication is an audible indication.

Suitably, the feature is one or more of a logo associated with the web-page, a company name associated with the web-page, the URL of the web-page and/or a service logo relevant to a service of the web-page. Suitably, the URL in the certificate is verified with the URL of the web-page prior to display thereof. The service logo may be an indication of an authorised payment method.

Suitably, the feature is determined from a digital certificate associated with the web-page.

Suitably, the digital certificate is part of the web-page. Alternatively, the digital certificate is stored in a local cache. As another alternative, the certificate may be stored in a remote cache.

Suitably, the certificate is associated with the web-page. Thus each web-page can have a unique certificate. Alternatively, a certificate may be unique for a root URL (such as www.amazon.com) and also be associated with pages derived therefrom (such as www.amazon.com/home).

Suitably, the feature is displayed as part of a tool-bar.

Suitably, the feature is displayed whereby it cannot effectively be overwritten. Suitably, the displayed feature is displayed whereby it overwrites each time it is overwritten. Suitably, the displayed feature is set to be always on top of a browser in focus.

Suitably, the certificate additionally comprises a computer executable file.

Suitably, the steps of determining a feature of the web-page and displaying the feature are carried out automatically. Generally, this has a plug-in software application. Thus user intervention is not required.

Each of the aforesaid methods may also be regarded as a method of communication.

According to the present invention in a seventh aspect, there is provided a system comprising a digital certificate comprising computer executable code associated with a web-page and an application on a user's computer which application is configured to verify the certificate and execute the computer executable code only if the certificate is verified.

In this specification, for the avoidance of doubt, computer executable code includes source code.

Suitably, the system is configured and adapted to operate a method according to any of the first or sixth aspects of the invention.

According to the present invention in eighth aspect, there is provided an executable program configured to operate a method according to the first and third to sixth aspects of the present invention.

According to the present invention in a ninth aspect, there is provided a computer system adapted and configured to operate according to any of the third to sixth aspects of the invention.

BRIEF DESCRIPTION OF THE DRAWINGS

The present invention will now be described, by way of example only, with reference to the drawings that follow; in which:

FIG. 6 is a screenshot illustrating part of a method according to another aspect of the present invention.

FIG. 9 is a screenshot subsequent to the FIG. 8 screenshot.

DESCRIPTION OF THE PREFERRED EMBODIMENTS

Figure 1:
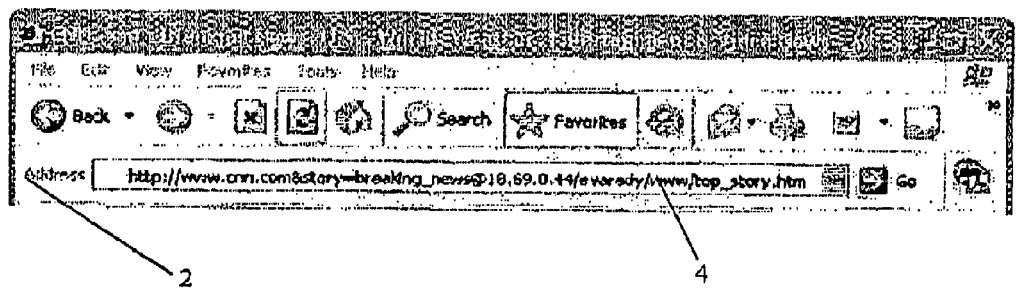
FIG. 1 is a known address bar image screenshot.
Figure 2:
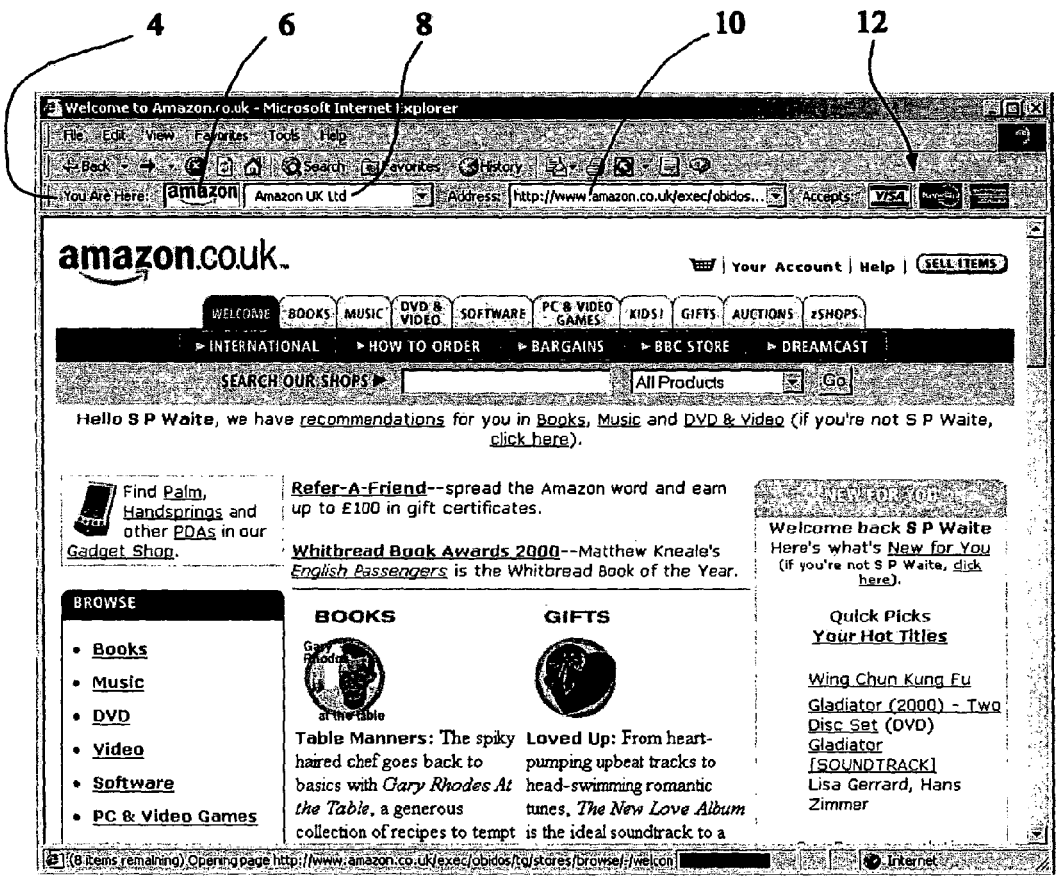
FIG. 2 is an address bar according to an embodiment of the present invention.

Referring to FIG. 2 of the drawings that follow, there is shown a web-page incorporating an address bar tool bar 4 according to the present invention.

The web-page in focus is, by way of example, amazon.co.uk (trade mark). The address bar 4 includes a company logo 6, a company name statement 8, the actual URL 10 and payment indications 12.

The address bar 4 is generated from a plug-in executable application operating on the user's computer.

The address bar 4 is set to be displayed "always on top" of the browser or window in focus so that it cannot be overwritten. The address bar 4 overwrites the existing address bar of the browser page. There are several ways in which this can be achieved, for instance the plug-in application can be configured to detect when an attempt is made by another application to overwrite the address bar 4, in which case the plug-in application will itself overwrite what ever previously was displayed with address bar 4. Alternatively the address bar can be set within the operating system to be always on top.

The address bar 4 provides four specific items of information in connection with the web-page: the logo 6, the company name 8 the actual URL 10 and payment indications. These items of information are obtained from data within a digital certificate within the web-page.

In an alternative embodiment the certificate may be obtained from a local cache in the user's computer having first been obtained from a remote web-page. This can be used when the web-page does not embed the certificate.

Alternatively, the certificate may be obtained from a remote cache. Generally this is a central database of certificates available on-line.

All three alternative certificate locations can be accommodated. When a user accesses a web-page the plug-in software checks whether the web-page has an embedded certificate. If so, it uses the embedded certificate. If not it checks the local cache and then, if necessary, the remote cache. The correct data for the particular web-page is obtained from the remote cache by matching the URL or IP address.

The web-page owner obtains a digital certificate in X.509 format from a trusted source. The digital certificate is signed by the trusted source and includes in dedicated fields data to provide the logo 6, company name 8 and actual URL 10, together with acceptable payment method logos—in this case American Express, Visa and MasterCard (trade marks). This information is extracted from the certificate, the digital signature having been verified by the plug-in application with knowledge of the public key of the trusted source.

Since the data provided in the address bar 4 originates from a trusted digitally signed source, the user can trust this display.

Logos can be embedded within the certificate in a gif file or other formats.

Figure 3:
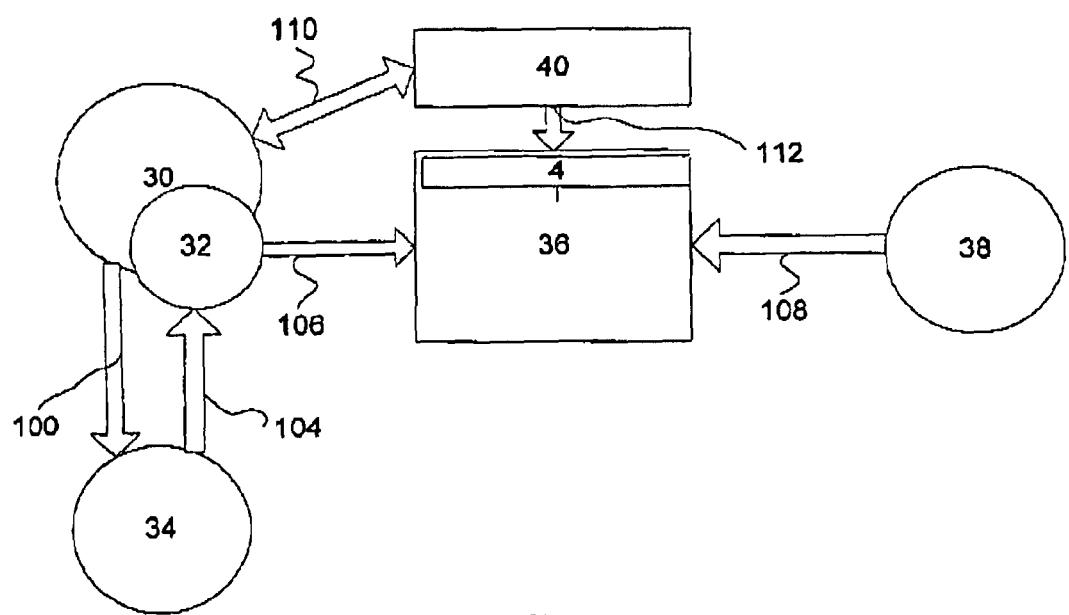
FIG. 3 is an illustration of a system of an embodiment of the present invention.
Figure 4:
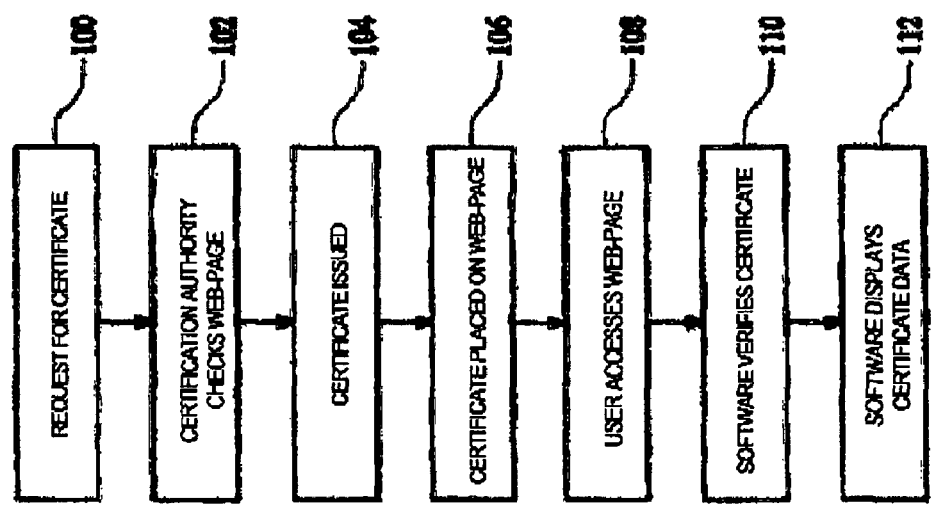
FIG. 4 is a functional flow diagram of a method corresponding to that shown in FIG. 3.

A system and method according to an embodiment of the present invention is illustrated in FIGS. 3 and 4, respectively. A web-page owner 30 makes a request for a certificate 32 from a certification authority 34 (step 100), a trusted source likely to be the supplier of the plug-in software for generating the address bar 4 of a web-page 36. The certification authority 34 makes such checks as it deems necessary of the web-page owner 30 and the web-page for which a certificate is sought (step 102). The scope and nature of these checks will vary dependent upon the information to be displayed. Assuming such checks are satisfactory to the certification authority 34, a digital certificate 32 is issued (step 104) to the web-page owner 30, which can place the certificate and, generally, a pictorial representation thereof on its web-page 36 (step 106).

When a user 38 uses an internet browser to access the web-page 36 (step 108) the plug-in software 40 verifies the certificate 32, using the digital signature thereof (step 110). The URL in the certificate is checked against the URL of the web-page as part of the verification process. If verified correctly, the plug-in software displays the data therein on the address bar 4 as described above (step 112).

If the digital certificate 32 is not present, a required field is missing or there is an error (such as the URL's do not correspond), a corresponding message is displayed.

Some digital certificates 32 may not contain all the information described above, especially the logo and/or payment information. Further, other information may be included and displayed.

As the address bar 4 is outside the control of the web-page owner it can be relied upon by the user. Further confidence is ensured because the information displayed is based solely on data obtained from a digital certificate from a trusted source. If the certificate is embedded within the web-page no extra on-line bandwidth is required for verification.

In an alternative option, the URL can be read from the web-page in focus using the HTML code fragment.

```
// mark next stage of the state machine
    This->Fetch=FETCH_URL;
    // keep a copy of the request URL (in this case the
variable for the
URL)
    strcpy(This->GetUrl,"javascript:document.URL;");
    // Request the browser to get the data
    NPN_GetURL(instance,This->GetUrl,NULL);
```

The plug-in software provides the user with the option of having the address bar 4 present where the browser address bar normally appears or, alternatively, separate from the browser as a separate window that can be placed and sized by the user, while always being on top.

Alternatively, the user can have the option of minimising the address bar to their taskbar (as it is referred to in a WINDOWS (trade mark) environment). Minimisation may be effected using password control or by a "minimise" command menu. It is noted that unlike present address bar displays, such commands remain outside the control of the web-page being accessed by the user so the owner of the potentially fraudulent page cannot control the floating address bar.

In this embodiment, when a browser with the address bar switched off is detected, the software will display in the taskbar a visual indication that the web-page currently being accessed is not displaying its address bar. It is then up to the user to view the data in the address bar read by the software by restoring or maximising the floating address bar to check whether the actual URL is what they expected or entered and view the other information presented. A visual indication proposed is that the minimised floating address bar will display the colour red on the taskbar if the address bar is switched off. A different (less prominent) colour can be displayed as an indication that the address bar is switched on. Alternatively or in addition an audible warning could be provided. Thus if the address bar is switched of f and a fraudster is artificially displaying what looks like an address bar the user is warned and can compare the read URL with that displayed.

A further application of the address bar 4 is as an alternative IP address resolver or locator. Normally an IP address is resolved by a user entering a URL in the URL section of the address bar. The browser looks at its domain name service server to resolve the URL to the relevant IP address and if available, the browser opens the relevant web-page.

It is well known that this procedure is open to a so-called Domain Name Server (DNS) attack in which a hacker breaks into the DNS, changes the IP address for one or more URL's and thereby misdirects web browsers.

Figure 5:
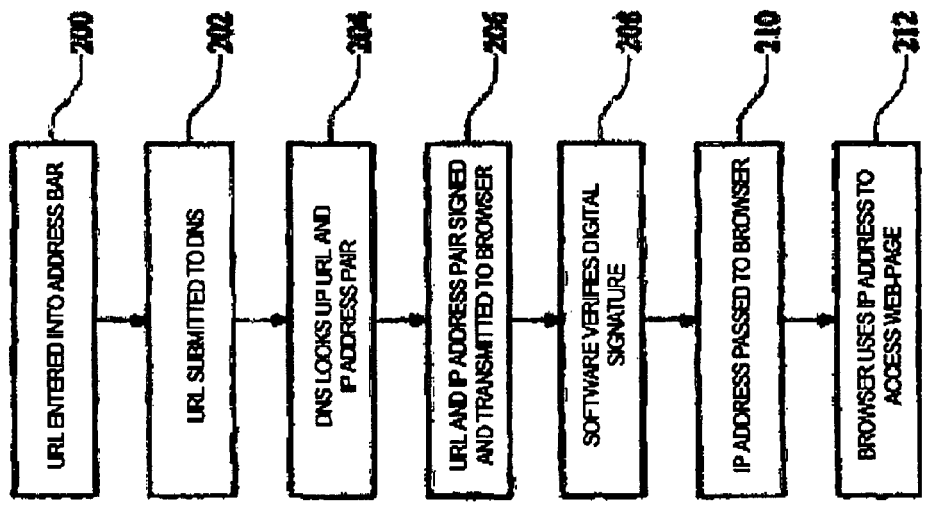
FIG. 5 is a functional flow diagram illustrating a method of an embodiment another aspect of the present invention.

According to embodiments of this feature of the present invention, DNS attacks can be nullified by the DNS storing URL's and IP addresses digitally signed. Referring to FIG. 5 of the drawings that follow, when a URL is entered (step 200) into the address bar by the user the URL is submitted to the DNS (step 202) which looks up the corresponding URL and IP address pair (step 204), which is digitally signed and transmitted to the browser (step 206). The pair may either be stored digitally signed or in a digital certificate, or may be stored separately and then signed prior to transmission to the browser. The former option is preferred for enhanced security. The plug-in application then verifies (step 208) the digital signature and only after it has done so satisfactorily is the IP address passed to the browser (step 210) and the browser uses the IP address to access the web-page (step 212). Thus according to this embodiment of the present invention, correspondence between the IP addresses and URL is maintained by the digitally signed record of the two together.

In a further option, the company name section of the address bar may be used as an alternative method of accessing web-pages. Internet users are familiar with the problem that the URL of a company may bear little or no relation to the company name. For instance, the URL may be an abbreviation of the company name or the company may have been forced to use an alternative because their domain name of choice has been purchased by another company or individual. However, the present inventor has observed that legal company names are, generally, unique. So far as the present inventor is aware, company names within a national jurisdiction are totally unique.

Figure 6:
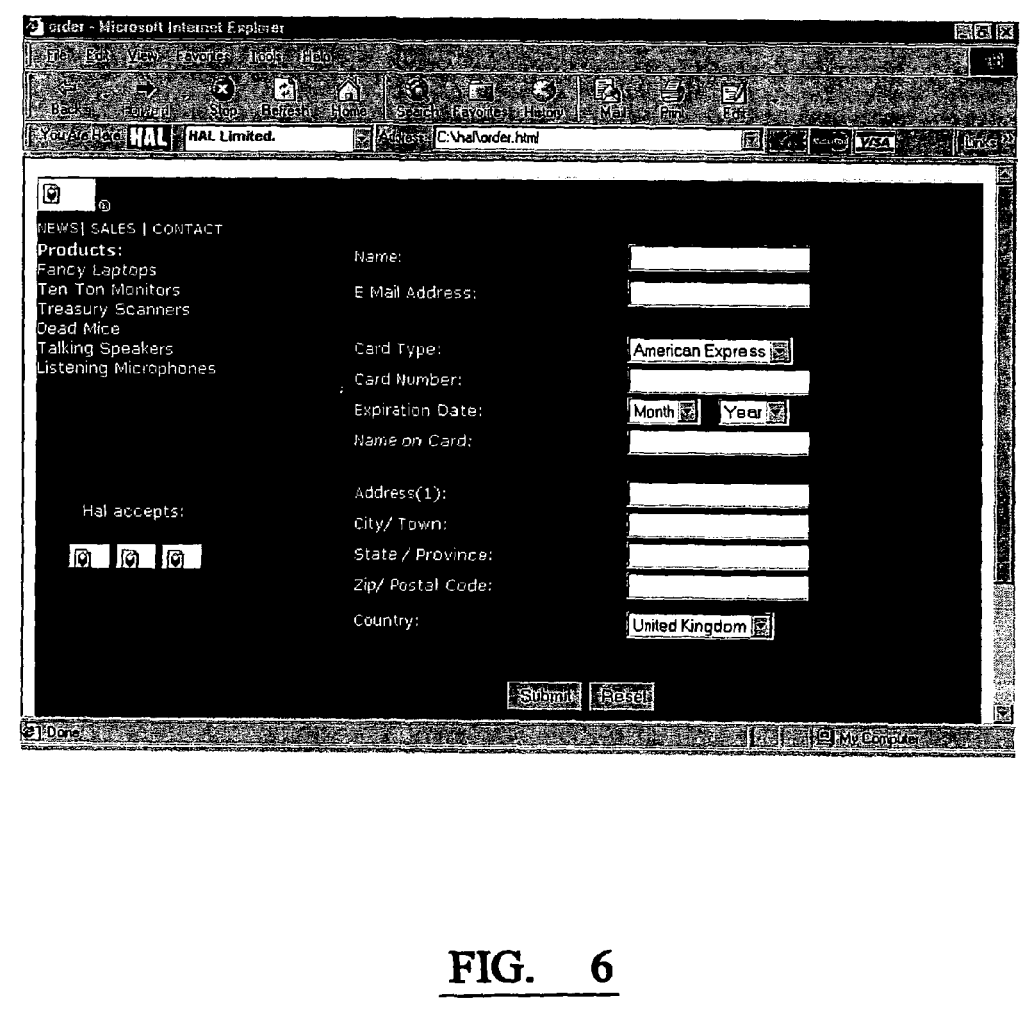

Thus according to this feature of the present invention and with reference to FIG. 6 of the drawings that follow, a user can enter a company name into the company name section 8 of the address bar (step 300) and initiate a search for a web-page corresponding to the company by activating a search button (step 302). The company name is sent (step 304) to a dedicated server which has a look up table in which it looks up (step 306) an IP address for the entered company name and thus provide the IP address to the browser (step 308) for it to access the web-page corresponding to that company (step 310). The IP address may be paired with the company name and digitally signed, as described above, for security purposes. Alternatively, access to the IP address may be via the URL.

The payment indications 12 in the address bar 4 may be used to more readily effect payments. Referring to FIG. 6 of the Figures that follow, there is shown a payment authorisation screen of a web-page incorporating an address bar 4 as described above. As part of the payment indication 12 there are icons 20, 22, 24 of known payment bodies, including American Express, Visa and Mastercard, respectively. Also shown is a web-form 26 for a user to enter their payment authorisation information onto to authorise a payment. This would include a card number request.

Figure 7:
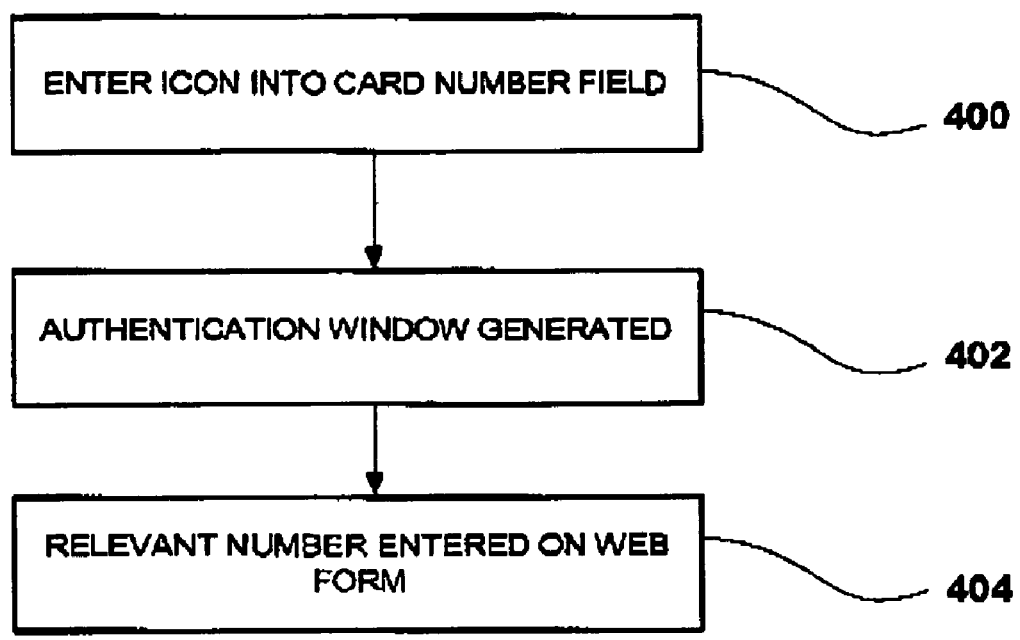
FIG. 7 is a functional flow diagram illustrating a method of an embodiment of another aspect of the present invention.
Figure 8:
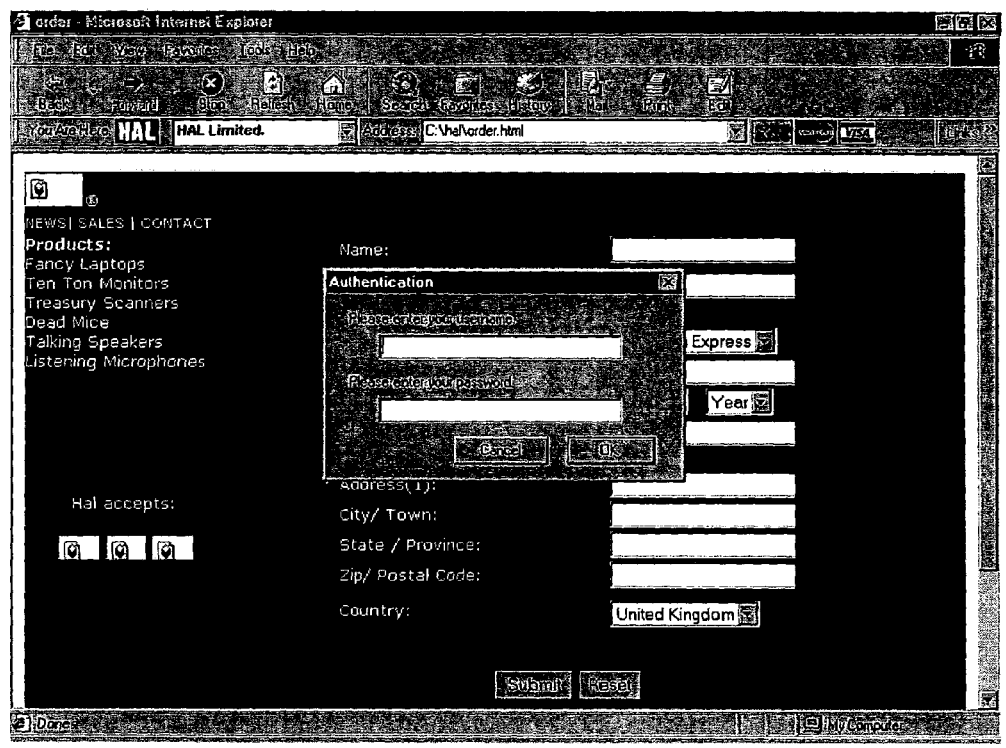
FIG. 8 is a screenshot illustrating a further part of the method illustrated in part in FIG. 6.
Figure 9:
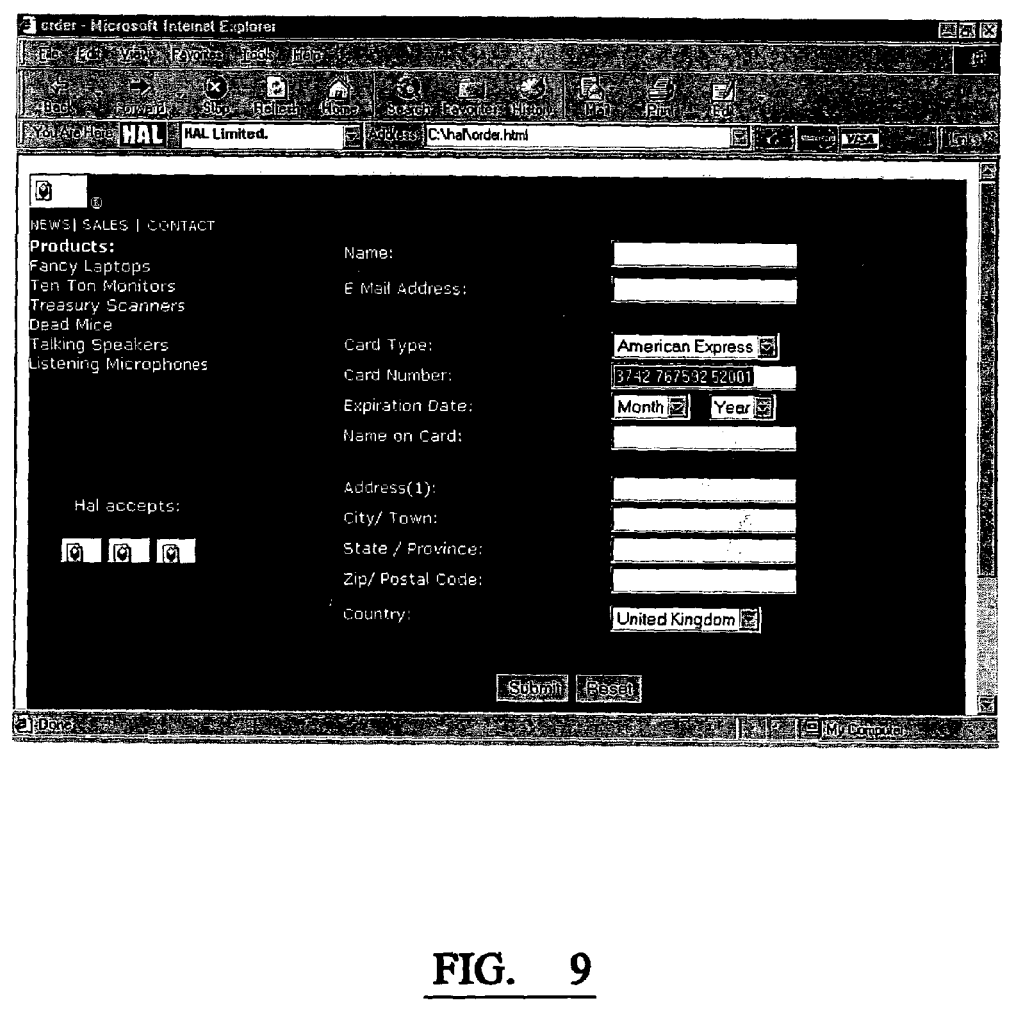

Referring to FIG. 7 of the drawings that follow, a user, wishing to enter data on to the web-form drags and drops (double clicking may be an option) an icon, in this case American Express icon 20 to the card number field (step 400) which generates (step 402) an authentication window (see FIG. 8) in which the user enters their user name and password corresponding to the American Express account they wish to use to pay. The relevant number (a random number corresponding to the card number) is then entered on the web-form automatically (step 404) (See FIG. 9).

Step 402 may be performed in a variety of ways. The digital certificate may include platform portable code therein (eg JavaScript) which the plug-in application needs and executes. When the logo is dragged and dropped the code presents the authentication window, or a web-page could be accessed. Alternatively the plug-in application may include the code for this operation based on an index in the certificate for the payment methods incorporated therein.

With reference to step 404, American Express provide a facility referred to as "Private Payment" in which, at the American Express web-page a user enters their predetermined user name and password. The web-page then provides the user with a unique random number bearing the same number of digits as the user's account number, but the account number is only derivable by American Express by cross-referencing the issued random number. When the user enters their user name and account number as described above, the application accesses the American Express web-page automatically to obtain the random number referred to above which is entered at step 404.

The web form(s) generated on the web-page may be digitally signed for extra security.

A further facility of the plug-in described is to control web-page access. When a user attempts to access a web-page, before it is displayed, the plug-in determines whether a relevant digital certificate is present with appropriate categorisation of an access level and only if the certificate is properly verified and the categorisation is authorised is access permitted. By way of example the plug-in can determine access based on age certificates. Thus an administrator may establish on a browser that access shall only be permitted to web-pages with an age certificate of 12 or under. When access to a web-page is checked and access is only permitted if the age certificate is 12 or under. If there is no age certificate (within the digital certificate) or if the age certificate is over 12, access is denied and a corresponding message may be displayed.

Verification of a digital certificate generally involves decrypting the secret key encrypted hash of the content of the certificate with the corresponding hash of the content of the certificate and comparing the decrypted hash with the created hash. Only if the two match is the digital certificate verified. Additional verification may include checking the digital certificate against a revocation list.

Thus, according to embodiments of the present invention each web-page has a unique certificate associated with it, giving details relevant to the web-page, whereas prior art certificates provide information about a separate web-server.

By displaying the feature within the viewable area of the browser in focus always on top it cannot be faked and is convenient for the user. It is noted that the "always on top" feature is only of a window in focus so, for instance, if a "task manager" is activated it will overwrite the address bar.

Embodiments of the present invention provide an automatic determination and display of at least one feature of a web-page. Thus user intervention is not required enhancing security reliability.

Embodiments of the present invention also provide a reliable method and system for executing computer executable code by providing the code in a digital certificate, verifying the certificate and using a separate application, the plug-in software, to execute the verified code.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of displaying an item of information relating to a website, the method comprising:
   generating and displaying an address bar that overwrites the display of an existing address bar of a browser,
   retrieving an item of information specific to the website from the contents of a digital certificate associated with the website, and
   displaying the item of information on the generated address bar so that the item of information cannot be overwritten, and is set to always be on top of the browser in focus.

2. A method of displaying an item of information according to claim 1, in which the item of information is selected from a group comprising a logo, a URL, and information about the website operator.

3. A method of displaying an item of information according to claim 1, in which the item of information is displayed in a window separate from the browser, website, and generated address bar and where the window is generated by an executable program on the user's computer that is separate from the browser.

4. A method of displaying an item of information according to claim 1, in which the method comprises the step of determining whether the generated address bar is not being actively displayed with the webpage in focus.

5. A method of displaying an item of information according to claim 4, in which the item of information is displayed only if the generated address bar is not being actively displayed with the webpage in focus.

6. A method of displaying an item of information according to claim 4, in which the method comprises the step of providing an indication that the generated address bar is not being actively displayed with the webpage in focus.

7. A method of displaying an item of information according to claim 6, in which the indication is a visual indication.

8. A method of displaying an item of information according to claim 6, in which the indication is an audible indication.

9. A method of displaying an item of information according to claim 1, in which the item of information retrieved from the digital certificate is selected from the group comprising of a logo associated with the web-page, a company name associated with the website, a URL of the website and a service logo of the website.

10. A method of displaying an item of information according to claim 9, in which the item of information is a URL in the digital certificate that is verified by the application as being the same as a URL of the website associated with the digital certificate prior to displaying of the item of information.

11. A method of displaying an item of information according to claim 1, in which the digital certificate is embedded as part of the website.

12. A method of displaying an item of information according to claim 1, in which the digital certificate is stored in a local cache.

13. A method of displaying an item of information according to claim 1, in which the digital certificate is stored in a remote cache.

14. A method of displaying an item of information according to claim 1, in which the item of information retrieved from the digital certificate is displayed as only if a URL in the certificate matches a URL of the website.

15. A method of displaying an item of information according to claim 1, in which the generated address bar will only display the item of information if the age of the digital certificate associated with the website is less than a set minimum requirement.

16. A method of displaying an item of information according to claim 1, in which generated address bar is displayed only if the browser's address bar is switched off by the website.

17. A method of displaying an item of information according to claim 1, in which the certificate associated with the website additionally comprises a computer executable file.

18. A method of displaying an item of information according to claim 1, in which the item of information is retrieved from a digital certificate in a local cache if the item of information cannot be retrieved from a digital certificate embedded in the website.

19. A system for displaying an item of information, the system comprising:
   a computer with an internet browser displaying a website with a digital certificate,
   an address bar that is generated by an application on the computer with the internet browser and is displayed (i) to always be on top of the browser displaying the website and (ii) only if the browser's address bar is switched off,
   an item of information of the displayed website that is stored as part of the contents of a digital certificate associated with the displayed website, and a location on the generated address bar where the item of information is displayed.

20. A system for displaying an item of information according to claim 19, further comprising means for displaying the item of information in a window that is separate from browser and the website and where the window is generated by an executable program separate from an interne browser program used for accessing the website.

21. A system for displaying an item of information according to claim 19, further comprising means for determining whether the generated address bar is not being actively displayed with the website in focus.

22. A system for displaying an item of information according to claim 21, further comprising means for displaying the item of information only if the generated address bar is not being actively displayed with the webpage in focus.

23. A system for displaying an item of information according to claim 21, further comprising an indicator of when the generated address bar is not being actively displayed with the webpage in focus.

24. A system for displaying an item of information according to claim 23, in which the indicator is a visual indicator.

25. A system for displaying an item of information according to claim 23, in which the indicator is an audible indicator.

26. A system for displaying an item of information according to claim 19, in which the item of information is selected from a group comprising a company name associated with the website, a URL of the web-page, and a service logo relevant to a service of the website.

27. A system for displaying an item of information according to claim 26, in which the item of information is a URL and where the URL in the digital certificate is verified as matching a URL, of the website being displayed in the browser.

28. A system for displaying an item of information according to claim 19, in which the digital certificate associated with the website is part of the website.

29. A system for displaying an item of information according to claim 28, in which the digital certificate associated with the website is stored in a local cache.

30. A system for displaying an item of information according to claim 28, in which the digital certificate associated with the website is stored in a remote cache.

31. A method of conveying address bar information to a computer user, the method comprising:
generating an address bar from an executable operating on the user's computer where the address bar is always on top of a browser in focus,
checking to see if a website accessed by the computer user through a browser has switched off the browser's address bar,
if the address bar has been switched off by the website, then displaying an indicator to alert the user that the address bar has been switched off; and
displaying the indicator by operation the executable operating on the user's computer where the display of the indicator is determined by the contents of a digital certificate associated with the website.

32. A method of conveying address bar information according to claim 31, in which the indicator about the address bar is displayed on the browser window.

33. A method of conveying address bar information according to claim 31, in which the indicator about the status of the address bar is displayed on the address bar generated by the executable running on the user's computer.

34. A method of conveying address bar information according to claim 31, in which the indicator about the status of the address bar is displayed in an independent window generated by the executable program that generated the address bar.

35. A method of conveying address bar information according to claim 31, in which the indicator about the status of the address bar is displayed on the taskbar of the operating system.

36. A method of conveying address bar information according to claim 31, in which the indicator is a visual indicator.

37. A method of conveying address bar information according to claim 31, in which the indicator is an audible indicator.

38. A method of conveying address bar information according to claim 36, in which the visual indicator is flashing the color red on the taskbar of the operating system.

39. A method of conveying address bar information according to claim 31, in which the generated address bar displays an item of information that is retrieved from the contents of a digital certificate associated with the website.

40. A method of conveying address bar information according to claim 31, in which the executable operating on the user's computer verifies that a URL of the digital certificate associated with the website matches a URL of the website displayed by the browser.

41. A method of conveying address bar information according to claim 31, in which the indicator of the status of the address bar is displayed whereby the indicator of the status of the address bar cannot be overwritten.

42. A method of conveying address bar information according to claim 31, in which the generated address bar is set to be always on top of a browser in focus.

* * * * *